United States Patent [19]

Hodge et al.

[11] Patent Number: 4,653,019

[45] Date of Patent: Mar. 24, 1987

[54] HIGH SPEED BARREL SHIFTER

[75] Inventors: James E. Hodge, Middletown; Kenneth C. Yeager, Eatontown, both of N.J.

[73] Assignee: Concurrent Computer Corporation, Holmdel, N.J.

[21] Appl. No.: 601,891

[22] Filed: Apr. 19, 1984

[51] Int. Cl.[4] .............................................. G06F 7/00
[52] U.S. Cl. .................................... 364/900; 364/715
[58] Field of Search ... 364/200 MS File, 900 MS File, 364/715

[56] References Cited

U.S. PATENT DOCUMENTS

| | | | |
|---|---|---|---|
| 3,961,750 | 6/1976 | Dao | 364/900 |
| 4,282,581 | 8/1981 | Bondurant et al. | 364/715 |
| 4,408,275 | 10/1983 | Kubo et al. | 364/200 |
| 4,437,166 | 3/1984 | O'Brien | 364/900 |
| 4,475,173 | 10/1984 | Talmi | 364/715 |
| 4,509,144 | 4/1985 | Palmer et al. | 364/715 |

Primary Examiner—Thomas M. Heckler
Assistant Examiner—Daniel K. Dorsey
Attorney, Agent, or Firm—Edwin T. Grimes; Francis L. Masselle; Thomas P. Murphy

[57] ABSTRACT

A multi-function high speed barrel shifter comprising three functional levels. The first level performs ¼ word shifts by a selectable amount. The second level performs ⅛ word shifts on the portion of the word to be shifted and, where desired, fills the remainder of its output with fill bits. The third level performs 1/32 of a data word shift. All shifting and filling are controlled by an input control signal which specifies the operation, direction and shift amount. The circuit is easily complimented in LSI Technology and is easily cascaded to double the size of the data word handled thereby.

13 Claims, 22 Drawing Figures

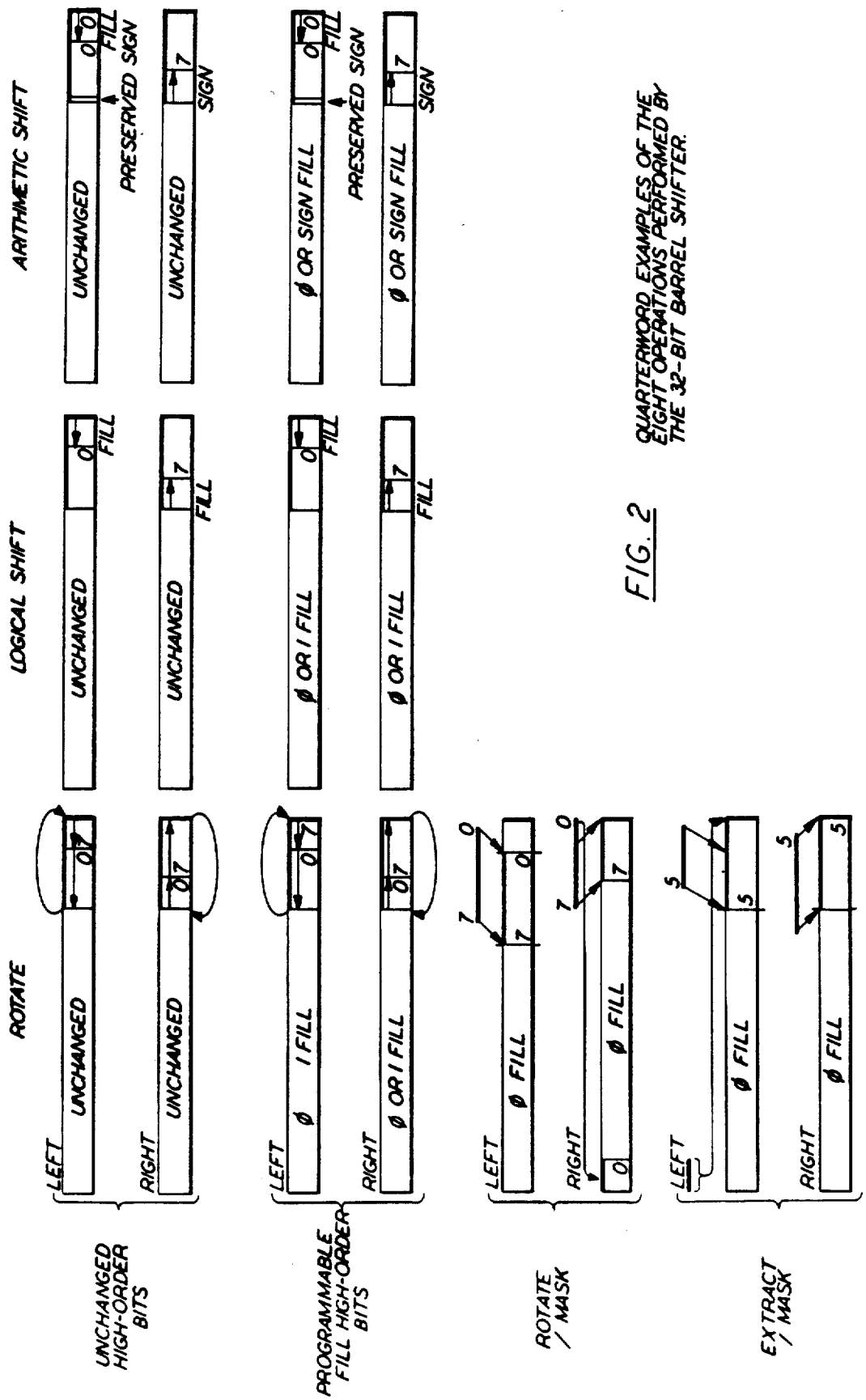
FIG. 2  QUARTERWORD EXAMPLES OF THE EIGHT OPERATIONS PERFORMED BY THE 32-BIT BARREL SHIFTER.

SECTION "B"

SECTION "A"

SECTION "Z"

| F | S | E | OUTPUT |
|---|---|---|--------|
| X | 0 | 1 | A |
| X | 1 | 1 | B |
| 1 | X | 0 | 1 |
| 0 | X | 0 | 0 |

(X = DON'T CARE)

TABLE 1

| F | EA | EB | S | OUTPUT |
|---|----|----|---|--------|
| X | 1  | 1  | 0 | A |
| X | 1  | 1  | 1 | B |
| 0 | 0  | X  | 0 | 0 |
| 1 | 0  | X  | 0 | 1 |
| 0 | X  | 0  | 1 | 0 |
| 1 | X  | 0  | 1 | 1 |

TABLE 2

| CONTROL LINES | $I_2$ | $I_1$ | $I_0$ | FW | $A_4$ | $A_3$ | $A_2$ | $A_1$ | $A_0$ | $A_I$ | dB | Odd | F | R |
|---|---|---|---|---|---|---|---|---|---|---|---|---|---|---|
| ROTATE | 0 | 0 | 0 | | | | | | | | | | | |
| ROTATE WITH FILL | 0 | 0 | 1 | | | | | | | | | | | |
| ROTATE AND MASK | 0 | 1 | 0 | | | | | | | | | | | |
| EXTRACT AND MASK | 0 | 1 | 1 | | | | | | | | | | | |
| LOGICAL SHIFT | 1 | 0 | 0 | | | | | | | | | | | |
| LOGICAL SHIFT AND FILL | 1 | 0 | 1 | | | | | | | | | | | |
| ARITHMETIC SHIFT | 1 | 1 | 0 | | | | | | | | | | | |
| ARITHMETIC SHIFT AND FILL | 1 | 1 | 0 | | | | | | | | | | | |
| FULL WORD OPERATION | | | | 1 | $M_4$ | $M_3$ | $M_2$ | $M_1$ | $M_0$ | $M_4$-$M_0$=SHIFT AMOUNT | | | | |
| HALF WORD OPERATION | | | | 0 | 1 | $M_3$ | $M_2$ | $M_1$ | $M_0$ | $M_3$-$M_0$=SHIFT AMOUNT | | | | |
| QUARTER WORD OPERATION | | | | 0 | 0 | 0 | $M_2$ | $M_1$ | $M_0$ | $M_2$-$M_0$=SHIFT AMOUNT | | | | |
| 64 BIT CONFIGURATION | | | | | | | | | | | 1 | | | |
| ODD SHIFTER IN 64 BIT CONFIGURATION | | | | | | | | | | | 1 | 1 | | |
| FILL BIT = 1 | | | | | | | | | | | | | 1 | |
| FILL BIT = 0 | | | | | | | | | | | | | 0 | |
| SHIFT DIRECTION = RIGHT | | | | | | | | | | | | | | 1 |
| SHIFT DIRECTION = LEFT | | | | | | | | | | | | | | 0 |
| ADDITIONAL LOW ORDER BIT FOR SHIFT AMOUNT IN 64 BIT CONFIGURATION | | | | | | | | | | M-1 | | | | |

*TABLE 3*

$SC_4 = S_4 \cdot FW$ (SEE FIG. 6 FOR $S_4$)
$SC_3 = S_3 \cdot FW$ (SEE FIG. 6 FOR $S_3$)
$SC_2 = S_2 \cdot FW$
$SC_1 = S_1 \cdot FW$
$SC_0 = S_0 \cdot FW$ $\overline{EC_1} = (\overline{I_2} \cdot I_1 \cdot \overline{I_0}) \cdot \overline{FW}$
$\overline{EC_4} = (\overline{I_2} \cdot I_1 \cdot I_0) \cdot FW$ $EN_e = (\overline{I_2} + \overline{R} + \overline{FW} + \overline{T_X}) \cdot (\overline{I_0} + I_1 + FW) \cdot (\overline{I_0} + \overline{I_2} + FW)$
$EN_d = (\overline{I_2} + R + \overline{S_4} + \overline{S_3}) \cdot (\overline{T_A} + S_4 + \overline{T_X}) \cdot (\overline{T_A} + S_3 + \overline{T_X}) \cdot (\overline{T_B} + \overline{I_0} + FW)$
$EN_c = (\overline{I_2} + R + \overline{S_4}) \cdot (\overline{T_A} + S_4 + \overline{T_X}) \cdot (\overline{T_C} + \overline{T_X}) \cdot (\overline{T_B} + I_0 + FW + A_4)$ $T_X = \overline{S_0} \cdot \overline{S_1} \cdot \overline{S_2} \cdot \overline{S_3} \cdot \overline{S_4}$  $\quad Q_0 = \overline{(\overline{I_2} + \overline{I_1})}$
$\overline{T_A} = \overline{I_2} + R + \overline{FW}$  $\quad Q_1 = \overline{(\overline{I_2} + \overline{I_1} + \overline{FW})}$
$T_B = (\overline{I_1} + I_2)$  $\quad Q_2 = \overline{(\overline{I_2} + \overline{I_1} + FW + \overline{A_4})}$
$\overline{T_C} = (\overline{I_2} \cdot \overline{R} \cdot FW \cdot \overline{A_4})$  $\quad Q_3 = \overline{(\overline{I_2} + \overline{I_1} + FW + A_4)}$ $FWM = Q_1 \cdot ((\overline{R} \cdot \overline{dB}) \cdot (\overline{R} \cdot A_1 \cdot \overline{ODD}) \cdot (\overline{R} \cdot \overline{A_1} \cdot \overline{ODD}))$
$F_C = (\overline{Q_0} + F) \cdot (\overline{Q_1} + \overline{SIGN} + R) \cdot (\overline{Q_2} + \overline{SIGN} + F) \cdot (\overline{Q_3} + \overline{SIGN} + F)$

*TABLE 4*

TABLE 5

$SB_4 = (S_4 \cdot FW) + ((\overline{S_3 + A_4 + I_2}) \cdot \overline{FW})$
$SB_3 = (S_3 \cdot FW) + (S_3 \cdot \overline{FW} \cdot A_4 \cdot I_2)$
$SB_2 = S_2 \cdot (FW + A_4)$
$SB_1 = S_1 \cdot (FW + A_4)$
$SB_0 = S_0 \cdot (FW + A_4)$ $\overline{EB_1} = (I_2 \cdot I_1 \cdot \overline{I_0} \cdot \overline{FW} \cdot \overline{A_4} \cdot \overline{A_3})$
$\overline{EB_4} = (I_2 \cdot I_1 \cdot I_0 \cdot \overline{FW} \cdot \overline{A_4} \cdot \overline{A_3})$ $EN_B = (\overline{I_2} + R + \overline{T_E}) \cdot (\overline{T_A} + S_4 + S_3 + \overline{T_X}) \cdot (\overline{T_C} + S_3 + \overline{T_X}) \cdot (\overline{T_D} + \overline{T_X})$
$T_D = (\overline{I_2} + R + FW + A_4)$
$T_E = S_4 + S_3$ $F_B = (Q_0 \cdot F) + (Q_1 \cdot SIGN \cdot R) + (Q_2 \cdot SIGN \cdot R) + (Q_3 \cdot SIGN \cdot F)$ $\overline{HWM} = (\overline{Q_2} + R + dB) \cdot (\overline{Q_2} + R + \overline{A_1} + ODD) \cdot (\overline{Q_2} + R + A_1 + \overline{ODD})$

TABLE 6

$SA_4 = (S_4 \cdot FW) + (S_3 \cdot \overline{FW} \cdot A_4)$
$SA_3 = S_3 \cdot (FW + A_4)$
$SA_2 = S_2$
$SA_1 = S_1$
$SA_0 = S_0$ $EN_A = (\overline{I_2} + R + \overline{T_X})$ $F_A = (Q_0 \cdot F) + (\overline{Q_0} \cdot SIGN \cdot R)$ $\overline{QWM} = (\overline{Q_3} + R + dB) \cdot (\overline{Q_3} + R + \overline{A_1} + ODD) \cdot (\overline{Q_3} + R + A_1 + \overline{ODD})$

TABLE 7

$SZ_4 = S_4 + \overline{FW}$
$SZ_3 = S_3 + (FW + A_4)$ $S_{LL} = I_2 \cdot T_1$

TABLE 8

$SC_{-1} = A_{-1} \cdot FW$
$SB_{-1} = A_{-1} \cdot (FW + A_4)$
$SA_{-1} = A_{-1}$

HIGH SPEED BARREL SHIFTER

BACKGROUND OF THE INVENTION

The invention relates broadly to the field of digital computers and particularly to a barrel shifter which is utilized as part of a computer in various operations.

Shifting operations are frequently used in the performance of computation in digital computers. Most large digital computers, often called main frames, have very elaborate shift circuits to perform the desired shifting operations at high speed. These circuits usually require a large number of gates especially if the shifter is capable of shifting data by a selectable number of bit positions. Accordingly, the shifters found in main frame computers are complex in design, high in circuit count and, therefore, are costly.

In smaller and less expensive computers, the shifting operation is usually done in a simple one bit at a time shifter and the operation is repeated as many times as is necessary to complete the desired shift amount. Obviously, the hardware cost of such a shifter is low but the performance suffers greatly as the speed of the operation depends directly on the number of one bit shifts performed.

Multi-level shift circuits are known, the circuit illustrated in U.S. Pat. No. 3,274,556 being typical. This patent illustrates a 64 bit shifter which can perform logical shifts and rotates in either direction. In addition, the circuit has only three levels of gates. The first level shifts 0, 16, 32 or 48 bits in either direction. The second level shifts 0, 4, 8, 12 bits to the right and the third level shifts 0, 1, 2, 3 bits to the right. This circuit, as is illustrated by the 23 sheets of drawings, is quite complex and hence expensive to implement.

Other complex shifter circuits are illustrated in U.S. Pat. Nos. 3,374,468, 3,239,764, 3,610,903, 3,350,692, 3,311,896, 3,510,846, 3,192,363, 3,374,463, 3,210,737, 3,582,899 and 3,229,080. All of these circuits have varying degrees of complexity and differences in functionality.

A newer design of a barrel shifter utilizing an SN74AS897 circuit is illustrated in an article in the Jan. 12, 1984 issue of Electronic Design starting at page 385. The AS897 is a multi-function 16 bit shifter. As illustrated in FIG. 2 of the article, however, four of the chips are required to perform the same operation on a 32 bit word. Thus, the AS897 is expensive to use in 32 bit applications and it is not altogether clear if it could be used in 64 bit applications.

In view of the above mentioned problems with barrel shifters and the generally desirable features of such devices, it is a primary objective to provide a barrel shifter which operates at high speed but which is not expensive either in circuit cost or in utilizing excessive circuit board space.

It is a further objective to provide a barrel shifter having the above mentioned desirable features but also being capable of working on data with variable format and to be able to perform arithmetic shift operations.

It is yet another object of the invention to provide a barrel shifter which is readily cascadable to operate on larger word sizes without inordinately increasing the circuit count.

BRIEF DESCRIPTION OF THE INVENTION

The foregoing and other objects, advantages and features are included in the barrel shifter of the present invention which is arranged in three functional levels. The first level is a programmable byte shifter in 32 bit configurations (½ word in other configurations). The second level performs selectable ½ byte (or 4 bit) shifts if desired. It also is capable of filling each bit position with either 0's or 1's. The third level provides selectable shifts of 0, 1, 2 or 3 bits. As such, any desired shift amount is selectable and desired data may be forced into selected bit positions.

BRIEF DESCRIPTION OF THE DRAWINGS

The foregoing objects, advantages and features of the invention are described below in connection with the drawings which form a part of the original disclosure wherein:

FIG. 2 illustrates the 8 general types of operations performable by the barrel shifter of the present invention;

FIG. 3 illustrates the manner in which FIGS. 3A, FIG. 3B, FIG. 3C and FIG. 3D fit together;

Figure 8:
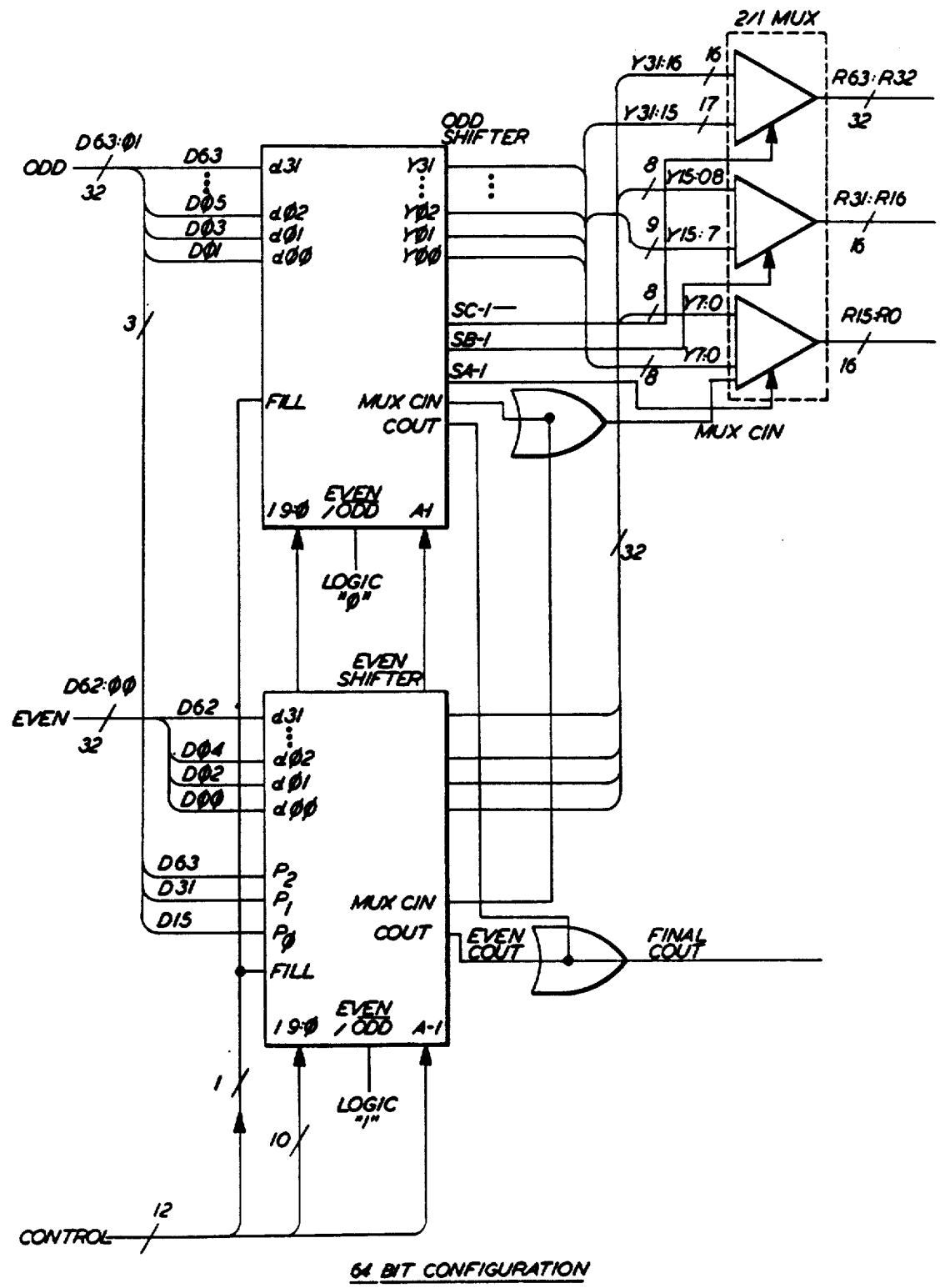
Figure 9:
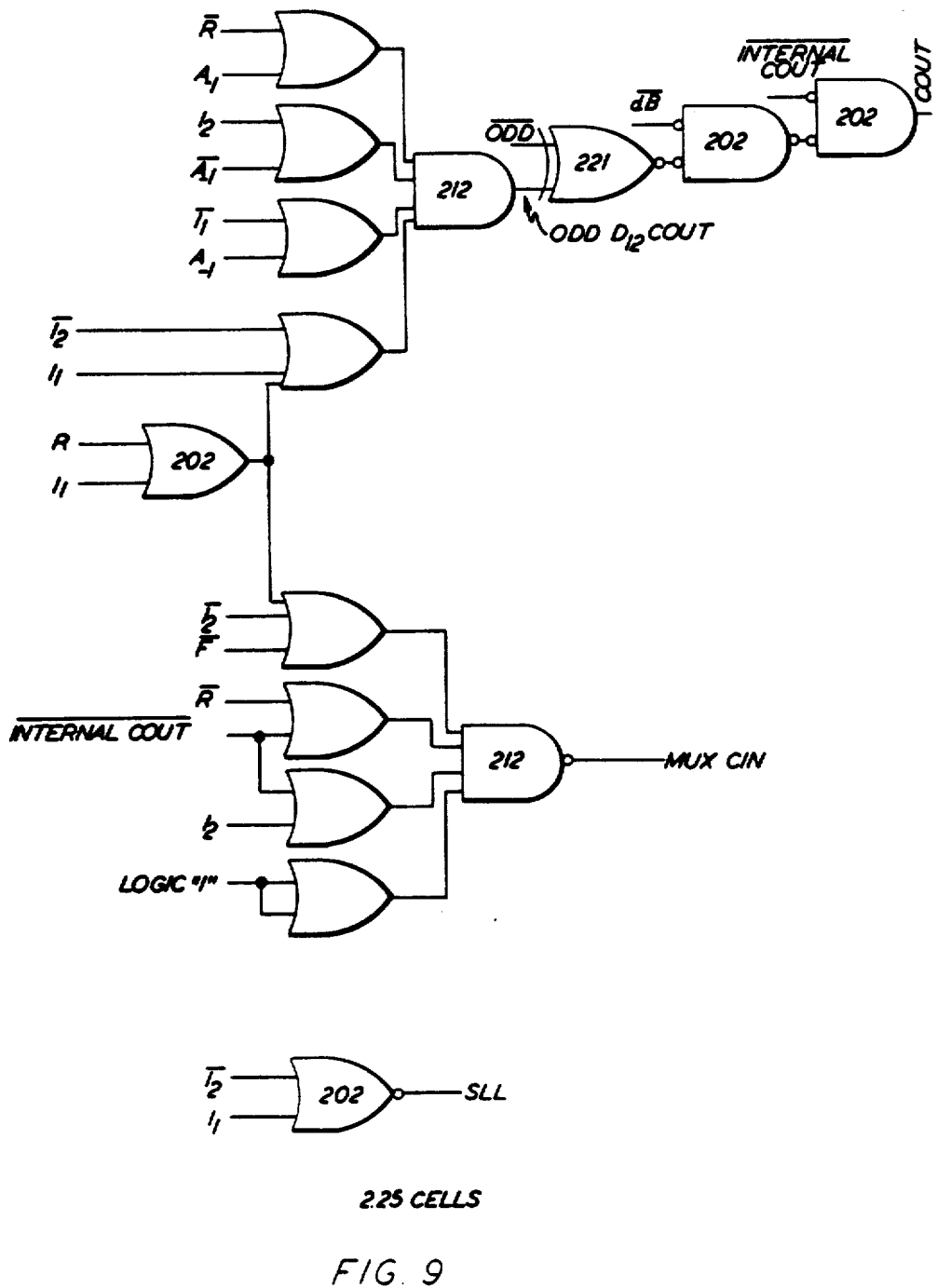

Table 3 defines the input control lines for initiating the various selectable functions of the present barrel shifter;

Tables 4-8 define the logic for producing control signals for FIGS. 3A-3D;

FIG. 8 shows the manner in which 2 chips incorporating the present barrel shifter are cascaded to make a 64 bit shifter; and FIG. 9 illustrates part of the control circuitry that is unique to the 64 bit configuration.

DETAILED DESCRIPTION

Figure 1:
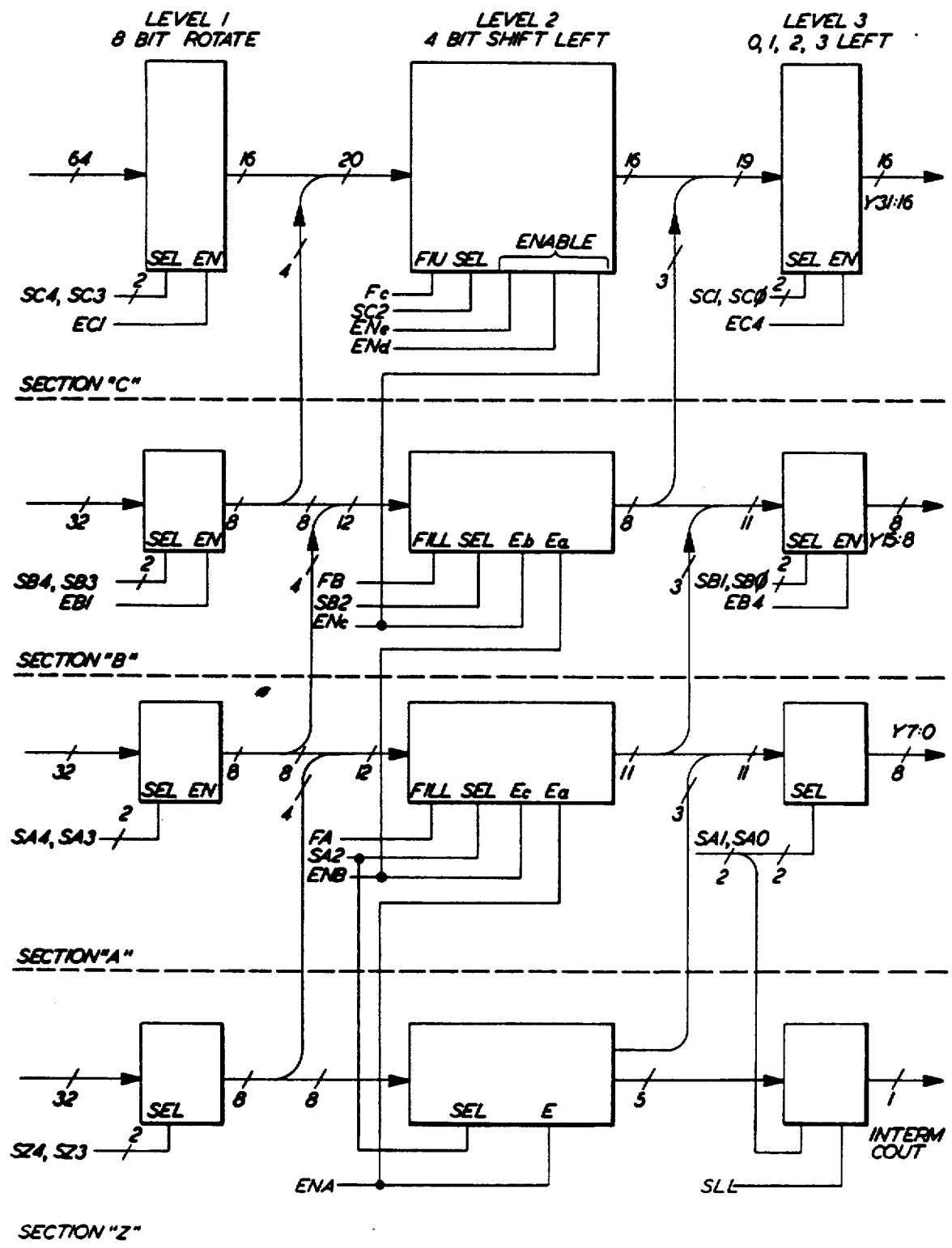
FIG. 1 is a block diagram of the data flow for the barrel shifter of the present invention.

FIG. 1 illustrates the data paths for the barrel shifter in accordance with the present invention. The barrel shifter is divided into three levels of logic indicated at the top as level 1, level 2 and level 3. As will become clear from the following discussion, the circuitry in level 2 and in level 3 actually may comprise more than one level of electronic circuits between the input thereto and its output.

The barrel shifter of the present invention as illustrated in FIG. 1 also is divided into sections, namely Section Z, Section A, Section B and Section C. The circuitry illustrated in FIG. 3A comprises Section C, the circuitry illustrated in FIG. 3B comprises Section B, the circuitry of FIG. 3C comprises Section A and the circuitry of FIG. 3D comprises Section Z.

Level 1 of the barrel shifter according to the present invention basically comprises an 8 bit rotate circuit which is operative to produce at its output data which has been shifted by 0, 8, 16, or 24 bit positions, depending on the control signals applied to the circuits of that level. Level 2 comprises a 4 bit shift left circuit along with additional circuitry for either preserving data or entering fill data into portions of the data word appearing at its output. Level 3 comprises a left bit shifter capable of shifting left either 0, 1, 2, or 3 bit positions. The cooperative operation of the circuits of level 1, level 2 and level 3 in the four sections under the control of the various control signals applied thereto is operative to produce a plurality of operations of the type illustrated generally in FIG. 2.

For example, one of the operations which can be performed by the barrel shifter of the present invention is a rotate of data bits in a given byte. When a left rotate is requested in the low order byte of a 32 bit word, the data bits can be shifted left a selectable number of bit positions. When this occurs, the lowest order bit position 0 is shifted to the left while the highest most bit position (7) is rotated around and enters the byte from the right and occupies the bit position immediately to the right of the previous lowest bit position 0. This type of rotate can be performed so that the ending position of bit 0 can be anywhere from 0 to 8 bit positions to the left of where it was originally with the remaining bits being rotated around into lower bit positions to the right of original bit 0. As illustrated in FIG. 2, a right rotate may also be performed which causes the 0 bit position to be rotated around to the leftmost bit position of the byte and shifted to the right to its final position. In a byte left or right rotate operation, the leftmost or highest order bytes of the 32 bit word, placed into the barrel shifter of the present invention, remains unchanged.

The barrel shifter of the present invention is also capable of performing a logical shift operation which is also illustrated in FIG. 2. In a left logical shift, the data bits in the bytes being acted on are shifted to the left a programmable number of bit positions. The bit positions to the right of original position 0 are filled with either a 0 or a 1 depending on what has been selected by the fill control signal. For a 1 byte logical shift left, the only data which is affected is the data in the rightmost byte (8 bits) which are input to the barrel shifter. In a similar manner, a right logical shift can be performed on the rightmost byte of the data input to the barrel shifter. In this manner, the highest order data bit position 7 and all lower order bit positions are shifted to the right the desired shift amount and the remaining bits in that byte are filled with fill bits in accordance with the control signals applied to the barrel shifter.

The barrel shifter according to the present invention is also capable of performing arithmetic shifts. When an arithmetic shift left is performed for the low order byte, the leftmost bit position is preserved as this bit position represents the sign of the data to the right of it in the byte. When an arithmetic left shift occurs, the data between bit position 6 and bit position 0 is shifted to the left. Each bit which would end up at bit position 7 or higher is dropped. All bits to the right of the position of bit 0 after it is shifted is filled with a fill bit of 0.

In the case of a right arithmetic shift in the low order byte, bit position, 7 (the sign bit) and bits 6-0 are shifted to the right and the low order bit positions to the right of bit position 0 after the shift are dropped. The bits between bit position 7 and the shifted sign bit are filled with the sign bit.

For the rotate, logical shift and arithmetic shift operations described so far, each of them can be performed on either a byte, half word, or full word. In byte operations, the 3 high order bytes are unchanged by the shifter. In the case of the half word operations, the left half word of the data entered into the barrel shifter remains unchanged while the right half is changed in a manner similar to that described above. When a full word operation is involved, however, all of the bits in the output will be different from those in the input provided there is a rotate or shift amount which is greater than 0.

The remaining operations illustrated in FIG. 2 are suitable only for half word and byte type operations. FIG. 2 illustrates how the left rotate with programmable fill instruction operates. In this case the low order byte is rotated to the left so that bit position 0 after the shift occupies any position from 0 to 7. All data to the left of the byte that has been rotated may be filled with either a 0 or a 1 depending on the selected fill bit. In a similar fashion, this operation can operate on a half word with the two low order bytes being rotated and the two high order bytes being filled either with all 0 or al 1. It will also be noted that the rotate may be performed in direction by sending a signal indicating the shift direction to the barrel shifter.

The logical shift operation with programmable fill operates in a similar manner. In the illustrated case of a lift shift, the low order bit position 0 is shifted to the left to a new position and the bits to the right of that are filled with the same type of fill bit that is inserted under program control for the three high order bytes. A similar operation works with respect to a half word.

The one byte logical shift with programmable fill can also shift to the right. In this case, the low order bits are dropped off and the high order bits are filled with the same type of bits as is programmably filed into the upper three most bytes of the data output from the barrel shifter.

The arithmetic shift with programmable fill operates either on a byte or a half word and the highest order bit of the data operated on comprises a sign bit which is preserved by the operation. When the arithmetic shift is in the leftward direction, the rightmost bit position vacated by data which is shifted left is filled with 0's. The bit positions to the left of the byte boundary on which the operation is performed is filled either with all 0's or with the sign bit under program control.

The right arithmetic shift with programmable fill operates in a similar manner in that the rightmost data bits are shifted to the right and the sign bit fills the bit positions vacated by the right shifted data. The data to the left of the boundary on which the shifting operation is performed is filled either with all 0's or with the sign bit.

The rotate left and mask operation causes the data which is being rotated to be rotated to the left by a programmable amount and all remaining bits are set to 0. In the case where the rotate right and mask operation is involved, the rightmost bit positions are wrapped around to the leftmost bit positions and all those in between the rightmost bit position after rotating and the leftmost bit position after rotating are filled with 0's.

The extract and mask operation is appropriate for half and quarter word operations and operate in the following manner. On the left extract and mask, the data bits in the appropriate portion of the input word is shifted left the programmable shift amount and the lower bits are filled from the high order bit positions of the data entering the barrel shifter. In this respect, it operates as a 32 bit rotate instruction. After the rotation of the data occurs, the output enables of the barrel shifter are conditioned so that the high order bit positions are forced to 0.

In the extract and mask right operation, the data in the relevant portion of the word is shifted right the programmable amount and the high order positions are filled by data from the input word located to the left of bit 7 or 15 depending on whether the mode is byte or half word respectively. The high order bytes are forced to 0. This operation is similar to the right rotate operation wherein the bits are shifted to the right but differs from that operation in that the high order bytes are forced to 0.

The barrel shifter according to the present invention which is capable of performing the operations described above in conjunction with FIG. 2 is illustrated in greater detail in FIGS. 3A-3D, these figures being placed together in the manner illustrated in FIG. 3.

Figure 3A:
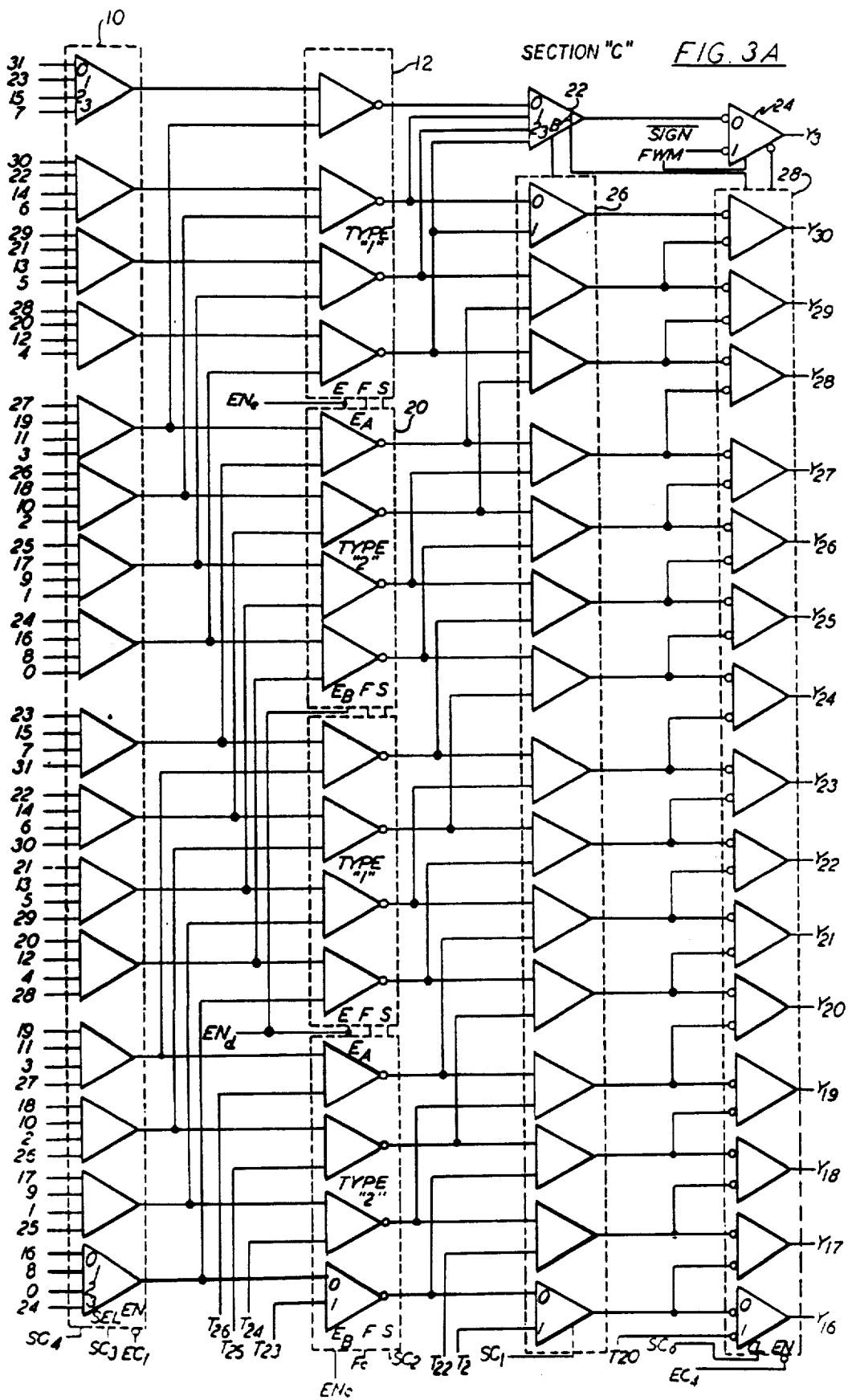
FIGS. 3A, 3B, 3C and 3D are a detailed circuit diagram of the data path for the barrel shifter according to the present invention.

Referring now to FIG. 3 and FIGS. 3A-3D, the detailed implementation of the data path for the barrel shifter of the present invention is shown. In FIG. 3A, a plurality of 4:1 multiplexers are shown inside the dotted line 10. These 4:1 multiplexers are gated by signals $SC_4$ and $SC_3$. The binary equivalent of the signals $SC_4$ and $SC_3$ causes the input pin to each of the 4:1 multiplexers within the dotted line 10 to gate the corresponding numbered input to its output. For example, if the binary equivalent of these signals is 0, the topmost multiplexer causes data bit position 31 to be gated to its output. If the binary equivalent of the signals $SC_4$ and $SC_3$ is a 1, binary bit position number 23 is coupled to the output. In a similar fashion if the binary equivalent of the signals is 2 or 3, the data input position 15 and data input position 7 respectively, are gated to the output. The remainder of the 4:1 multiplexers in the dotted line 10 operate in the same manner under control of the same selecting signals. In addition, all of the multiplexers are subject to a common enabling signal $EC_1$.

It will be noted that the input lines to each of the 4:1 multiplexers within the dotted line 10 have numbers immediately to the left. These numbers correspond to the binary bit position for the data being input to the barrel shifter. It will be noted that the data bit positions are numbered in the traditional fashion with bit position 0 corresponding to the lowest ordered bit position and bit position 31 corresponding to the highest order. The gating signals $SC_4$, $SC_3$ and $EC_1$ are all generated by a control circuit which is discussed later.

Figure 4:
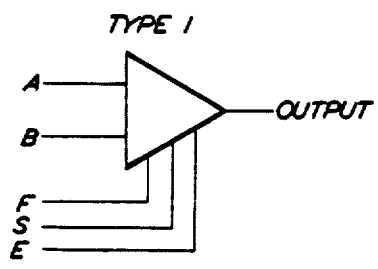
FIGS. 4 and 4A and Table 1 illustrate the Type 1 circuit used in FIGS. 3A-3D.
Figure 4A:
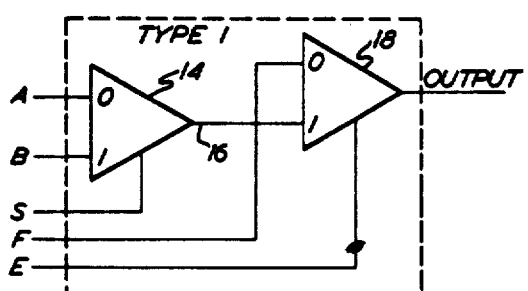

The output of each of the 4:1 multiplexers within the dotted line 10 are coupled in the manner illustrated in FIG. 3A to inputs to the circuits which comprise level 2. Level 2 is comprised of a plurality of circuits of different types. For example, within the dotted line 12, there are circuits of type "1". Type 1 circuits are illustrated in FIG. 4 and this type of circuit has a truth table as illustrated in Table 1. A detailed implementation of the type 1 circuit is shown in FIG. 4A which comprises two 2:1 multiplexers, the first being coupled to the second. The first 2:1 multiplexer 14 has a data input line A and a data input line B and a selection line S. When the line S is 0, the input A is coupled to the output line 16. When the line S is a 1, the input line B is coupled to the output line 16. This output line 16 comprises an input to a second 2:1 multiplexer 18 which has a selection line E and a second data input line F. This multiplexer 18 operates to place the level of the line F on the output of the type 1 circuit whenever the selection line E is 0. When the selection line E is 1, however, the data appearing on the line 16 appears at the output of the type 1 circuit.

Figure 5:
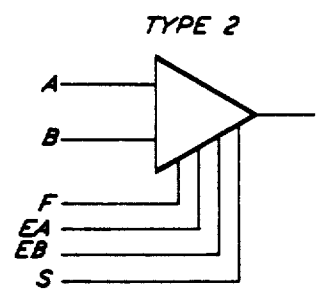
FIGS. 5 and 5A and Table 2 illustrate the Type 2 circuit used in FIGS. 3A-3C.
Figure 5A:
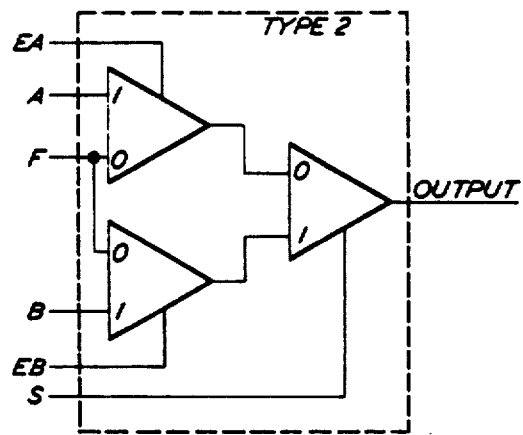

Returning to FIG. 3A, the second level also includes type 2 circuits such as within dotted line 20. The type 2 circuit is shown in greater detail in FIG. 5 and this circuit has a truth table as illustrated in Table 2. The detailed implementation for type 2 circuits is shown in FIG. 5A. The type 2 circuit comprises three 2:1 multiplexers of the type used in FIG. 4A and those of skill in the art will readily recognize that the configurations shown in FIG. 5A produces the truth table of Table 2 for the inputs EA, A, F, B, EB and S where inputs A and B are data inputs and the remainder of the inputs are control inputs.

The circuits of type 1 and type 2 comprising level 2 of Section C have their outputs connected to level 3 of Section C in the manner illustrated in FIG. 3A.

In level 3 of Section C, the highest order bit position there is a 4 input multiplexer 22 whose inputs are from level 2 in the manner illustrated in FIG. 3A. This multiplexer is controlled by the signals $SC_1$ and $SC_0$ and operates in the manner of the 4 input multiplexers within the dotted line 10. The output of this multiplexer 22 is coupled to a 2 input multiplexer 24. The second data input to this multiplexer 24 is a line which indicates the sign bit for the data word input to the barrel shifter. The multiplexer 24 under certain conditions of the operations discussed above, must preserve the sign bit at the output bit position $Y_{31}$. This is accomplished by the multiplexer 24 when the appropriate control signals appear on the lines FWM and $EC_4$.

The remainder of level 3, Section C comprises two levels of 2 input multiplexers. The first level is found within dotted line 26 and has a plurality of 2 input multiplexers each which is controlled by the control line $SC_1$. When the binary value on that line $SC_1$ is a 0, the 0 input of each multiplexer within the dotted line 26 is coupled to its output. In a similar fashion, if the line $SC_1$ is a 1, the 1 input to each multiplexer within the dotted line 26 is coupled to its output.

The second level of 2 input multiplexers within level 3 of Section C is illustrated within the dotted line 28. By reason of the inverting input to these multiplexers, the data appearing at the output is of the same polarity as the data appearing at the input to the barrel shifter as there is an inversion produced by the circuitry within level 2 and in level 3. The multiplexers within the dotted line 28 are controlled by the control line $SC_0$ and the enable line $EC_4$.

Figure 3B:
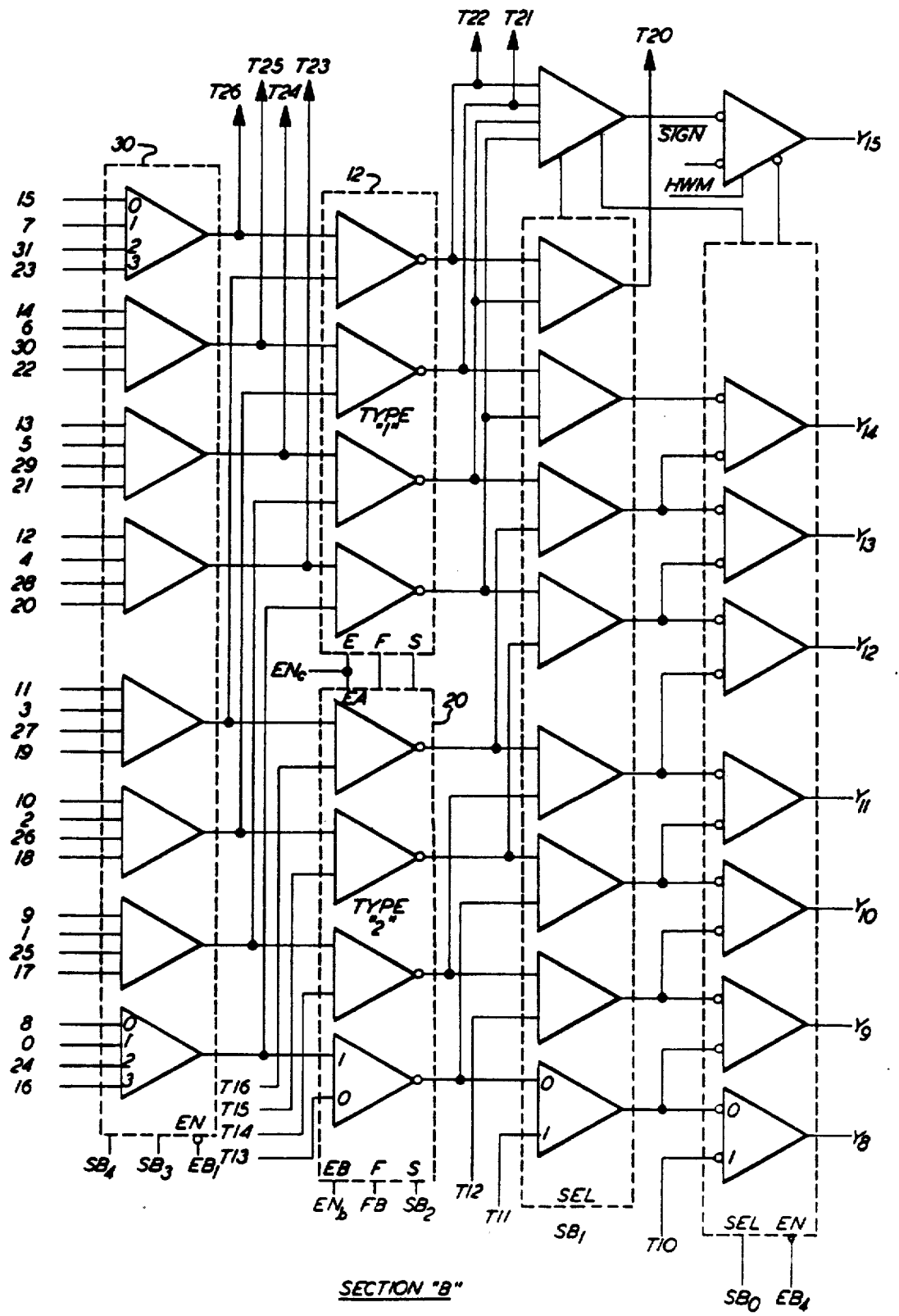

Referring now to FIG. 3B, the circuitry of Section B is illustrated. This circuitry is essentially of the same type as already described in conjunction with FIG. 3A. For example, in level 1 there are a plurality of 4 input multiplexers shown within dotted line 30. These multiplexers are controlled by the signals on the lines $SB_4$ and $SB_3$ and the circuits are all enabled by the enable signal $EB_1$. Multiplexers within the dotted line 30 gates the signal from the input line 0 to its output when the binary value for the signals $SB_4$ and $SB_3$ is 0 in a similar manner to the multiplexers within dotted line 10 of FIG. 3A. When the signal values for the lines $SB_4$ and $SB_3$ have a binary value of 1, 2 and 3, the multiplexers within the dotted line 30 respectively couple input pins 1, 2 and 3 to the output.

The multiplexers within dotted line 30 are coupled to the type 1 circuit 12 and the type 2 circuit 20 of FIG. 3B in the manner there illustrated. In addition, the four uppermost multiplexers within dotted line 30 are coupled by the lines illustrated to the bottom most type 2 circuit 20 of FIG. 3A. The type 1 and type 2 circuits of FIG. 3B are of the same design as the corresponding circuits in FIG. 3A, however, the circuits of FIG. 3B are gated by different gating signals which are illustrated in the drawing.

The circuitry of level 2 in Section B couples to level 3 in a manner similar to the level 2 coupling to level 3 of FIG. 3A. In a similar fashion, the circuitry of Section B, level 3 is essentially the same as that illustrated in FIG. 3A, however, it is only for 8 output data bits whereas the circuitry of FIG. 3A encompasses 16 output data bits. A further difference is the gating signals used to control the multiplexers in Section B, level 3. These signals are labeled in FIG. 3B and the circuitry for generating those signals will be described later.

Figure 3C:
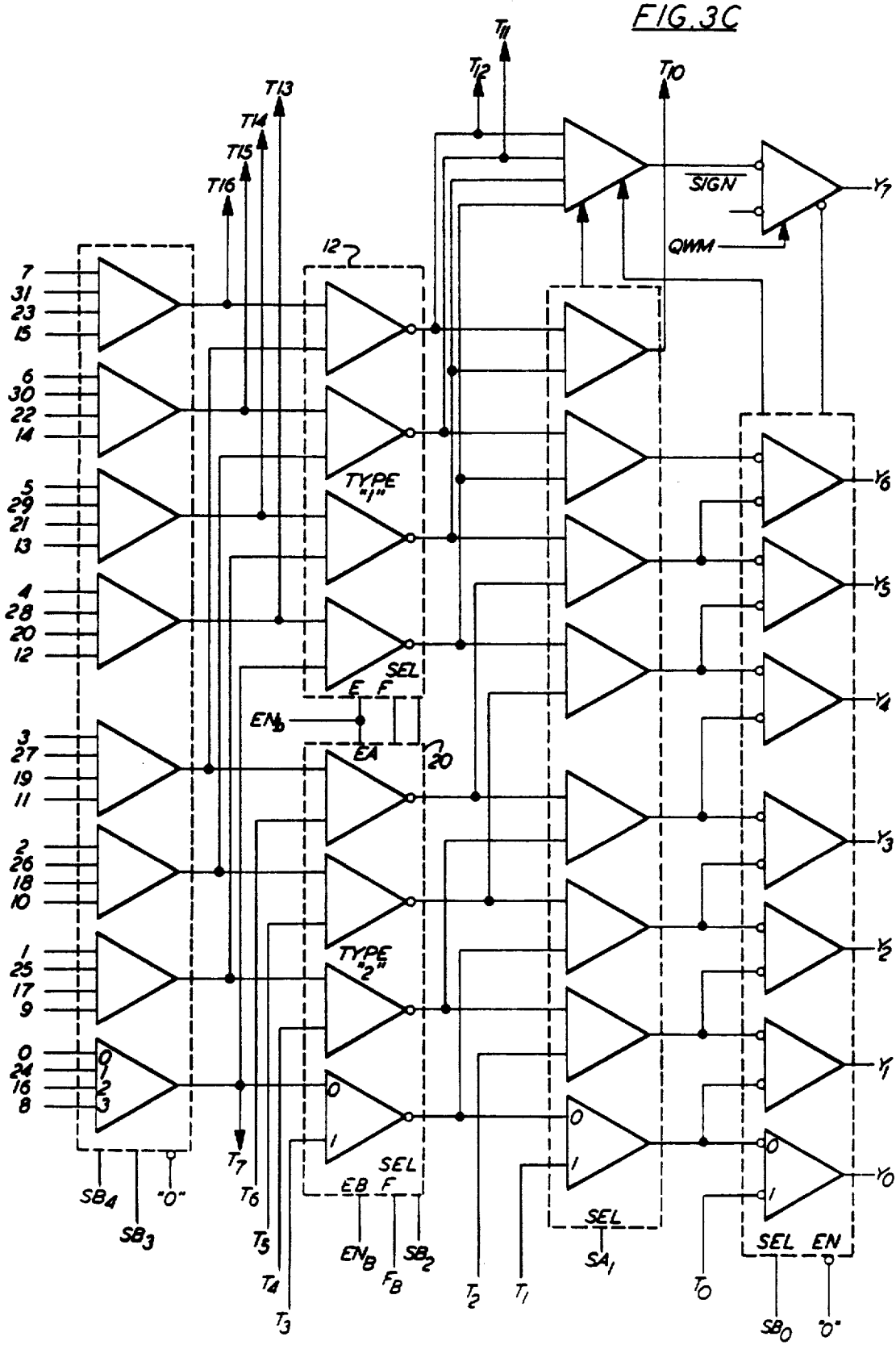

FIG. 3C illustrates Section A of the barrel shifter and the circuitry shown therein is essentially identical to the circuitry of Section B as illustrated in FIG. 3B, however, the gating signals used to control the circuits of FIG. 3C are somewhat different. These different gating signals are produced by circuitry to be described later. The circuits of FIG. 3C, however, respond to the gating and data signals in the same manner as do the circuits of FIG. 3B and, accordingly, need not be described here in further detail.

Figure 3D:
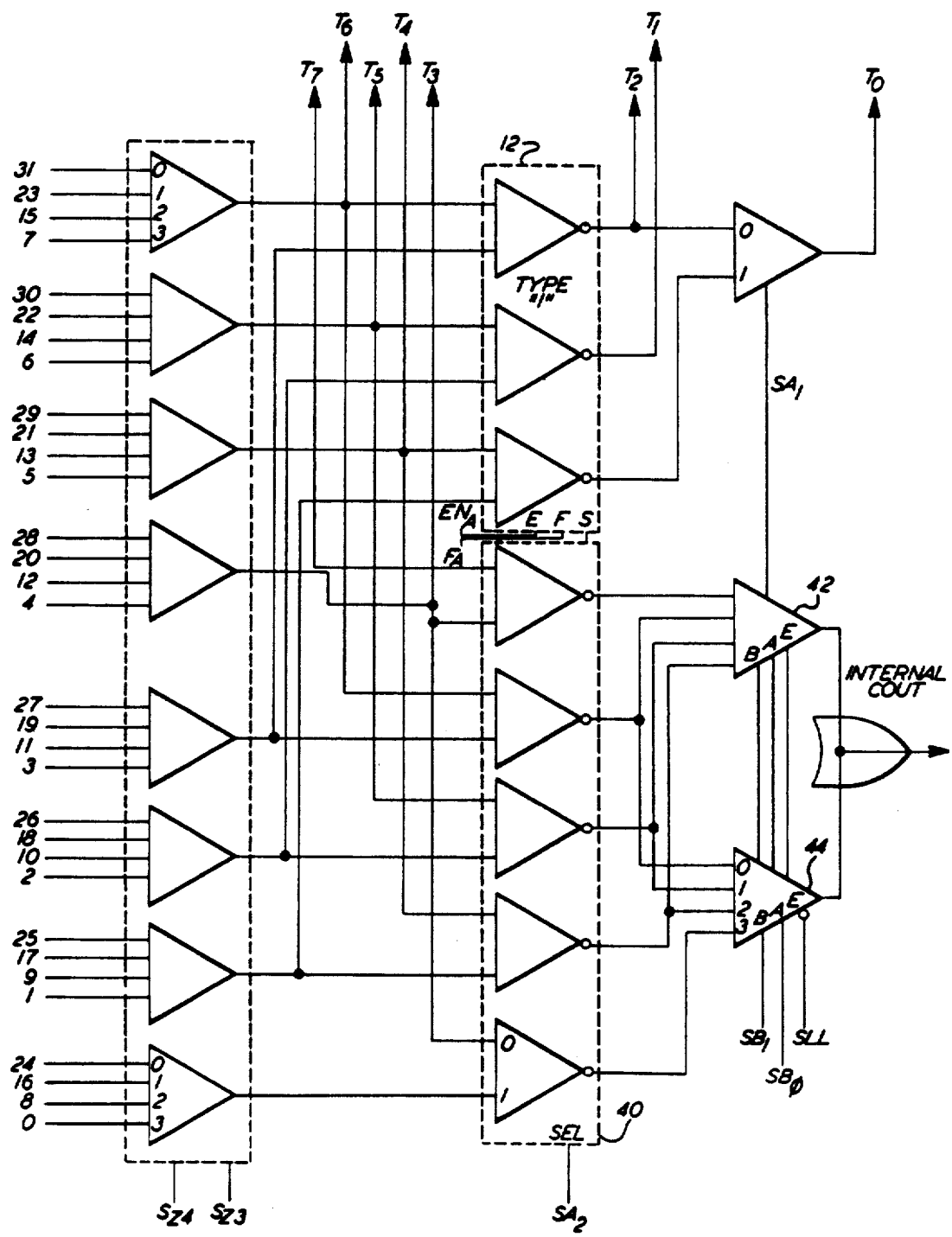

Referring now to FIG. 3D, Section Z of the barrel shifter is illustrated. This Section is somewhat different from the previously described Section, however, the circuitry embodied therein is essentially the same type as those described earlier. Section Z includes in level 1 a plurality of 4 input multiplexers controlled by the control signals $SZ_4$ and $SZ_3$. These multiplexers operate in the same manner as the 4 input multiplexers already described and couple their output in accordance with the lines illustrated in FIG. 3D to other second level circuits. In the second level of Section Z there are three type 1 circuits within the dotted line 12. These are of the same type as have been previously described. Within the dotted line 40 is a plurality of 2 input multiplexers which are controlled by the binary state of the signal $SA_2$. The output of these multiplexers within dotted line 40 couple to two 4 input multiplexers 42 and 44 which are controlled by the enable line SLL as well as the selecting lines $SA_1$ and $SA_0$. The multiplexers 42 and 44 work in the same manner as the 4 input multiplexers described above. The outputs of these multiplexers are wired together to form a "dot OR" to produce a signal called internal $C_{out}$. This is a carry bit coming out of the barrel shifter and it is utilized in certain arithmetic and logical functions in digital computers.

Table 3 illustrates the binary input data to the barrel shifter according to the present invention which control the operation of the circuitry already described. The signal lines $I_2$, $I_1$ and $I_0$ are utilized to define the instruction type. Since there are 3 bit positions available, 8 unique instruction types can be defined and these correspond to those discussed earlier in conjunction with FIG. 2.

In addition to the instruction lines, there is a line labeled FW. This line corresponds to a full word format indication. In the event this line is a binary 1, the input lines $A_4$, $A_3$, $A_2$, $A_1$ and $A_0$ are utilized to define the shift amount in bits.

In the event that the input line FW is 0 and the input line $A_4$ is a 1, this indication is utilized to specify a half word format for the instruction operation defined by lines $I_2$, $I_1$ and $I_0$. The shift amount in bits is defined by the data on the lines $A_3$, $A_2$, $A_1$ and $A_0$.

When the lines FW, $A_4$ and $A_3$ are all 0, this signifies a quarter word format and the data on the lines $A_2$, $A_1$ and $A_0$ define the number of bits to be shifted.

The input line R is used to designate the direction of the shift operation. When the line R is a 1, the shift is in a right direction and when the line R is a 0, it is in the left direction.

The circuitry according to the present invention can also be utilized to perform 64 bit barrel shift functions of the same type already described in conjunction with 32 bit operations. In the 64 bit configuration, which will be described further below, there are basically two identical circuits of the type already described which are coupled together in a unique manner. When the circuits are in the 64 bit configuration, the circuits must receive signals indicating that this is the case and this signal appears on the line labeled dB. In the 64 bit configuration, the circuitry of the present invention is operative to perform 64 bit, 32 bit and 16 bit operations. In the case of a 64 bit configuration, a further shift amount bit is required and this appears on the input line labeled $A_{-1}$. In addition, the 64 bit configuration is wired in a unique manner such that even data bits are input to one chip having circuitry of the type already described and odd bits are input into a second chip the same as the first chip. Accordingly, the circuitry must know whether it is receiving even data bits or odd data bits. This is accomplished by the line labeled Odd. When this line is a 1, the input data is the odd data bits and when it is a 0, the input data is the even bits.

The defined operations for the present barrel shifter include operations with a programmable fill bit. This fill bit is input to the circuitry over a line labeled F.

From the above-mentioned input signals, the control signals for controlling the circuitry of FIGS. 3A–3D are generated.

Referring now to FIG. 3A, there are a plurality of control signals utilized to control the circuitry therein. These control signals are developed from the control signals $I_2$, $I_1$, $I_0$, FW, $A_4$, $A_3$, $A_2$, $A_1$, $A_0$, $A_{-1}$, R, dB, and Odd which are listed across the top of Table 3. In the circuit diagrams and in the equations for circuits used to develop the various control signals, in some instances the signal name has a bar over the top of it. This is to denote in the traditional fashion that the signal has the opposite logic level to that of the same signal without the bar over it. In addition, the equations use traditional symbols to designate the logical operations of AND and OR. Specifically, the dot is used to designate the AND function and the plus sign is used to designate the OR function.

Figure 6:
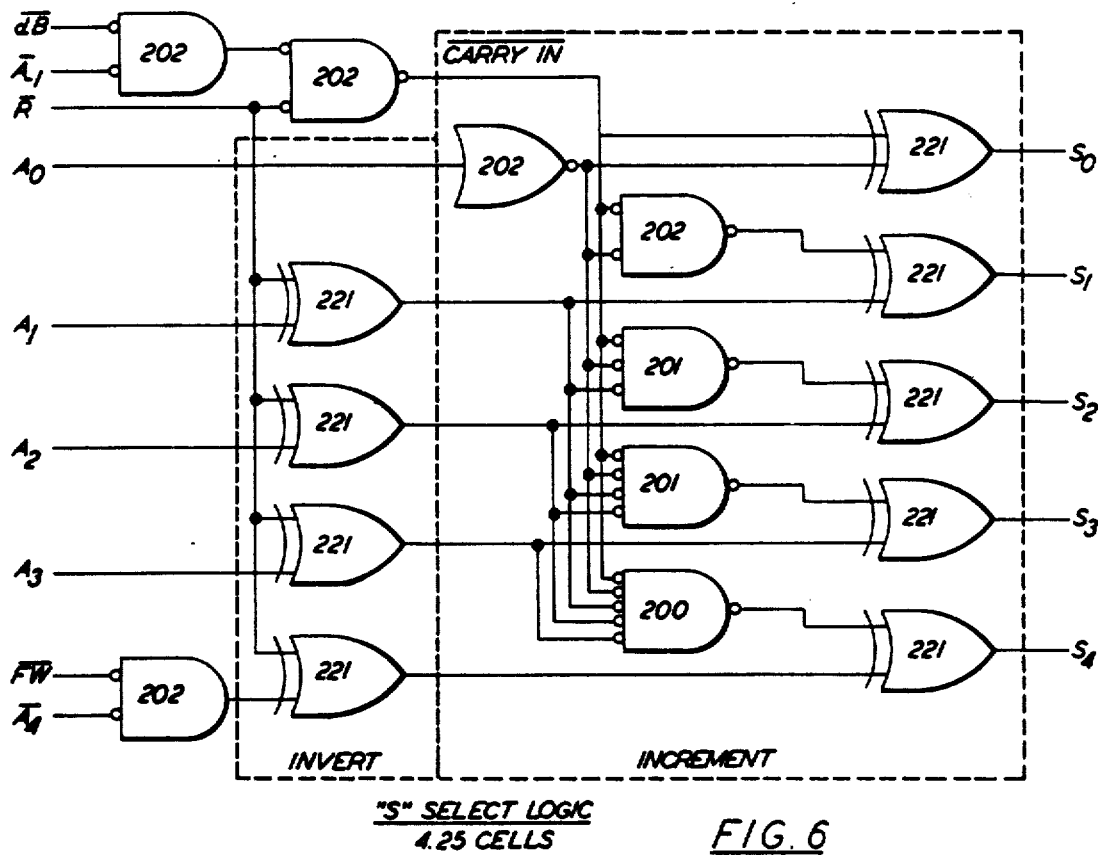
FIGS. 6 and 7 illustrate portions of the control circuitry for controlling the circuits of FIGS. 3A-3D.

Referring now to Table 4, the logical equations for various of the control signals in FIG. 3A are there stated. Some of these equations are entirely stated in terms of input signals as appearing in Table 3 while some of the other equations are stated in terms of other variables which themselves are combinations of input signals or of signals developed in the circuitry in either FIG. 6 or FIG. 7. The circuitry of FIG. 6, for example, is responsive to only input control signals listed in Table 3 and produces intermediate control signals designated $S_0$, $S_1$, $S_2$, $S_3$ and $S_4$. In accordance with Table 4, these signals generated by the circuitry of FIG. 6 are ANDed together with the FW control signal to produce the signals $SC_4$–$SC_0$. in accordance with the equations set forth in Table 4. These particular select signals are used to control the multiplexers of FIG. 3A in the manner described earlier.

Figure 7:
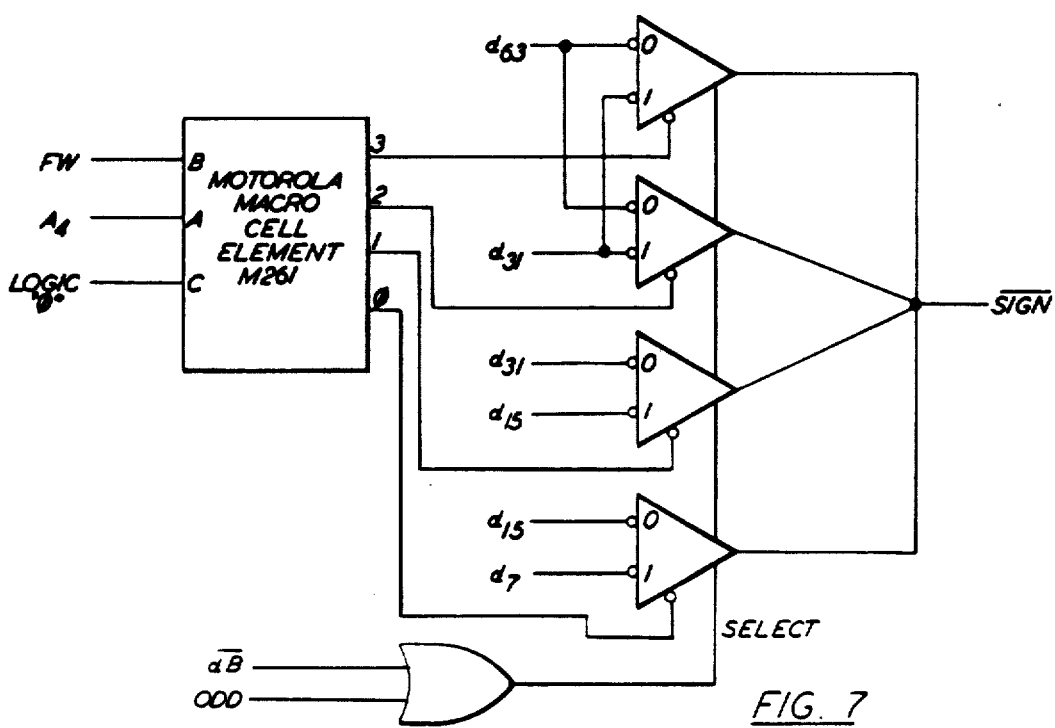

The circuitry according to FIG. 7 is designed to generate the signal SIGN which represents the inverted sign bit which should be preserved by the barrel shifter of the present invention in certain of the operations which are performed by the shifter. The output signal from the circuit of FIG. 7 is the inverted sign bit and it is inserted into the output bit position $Y_{31}$, $Y_{15}$ or $Y_7$ in accordance with the control signals applied to the multiplexer producing those output bit positions.

It will be noted that FIG. 7 also includes inputs from data positions 63, 31 and 15 into the 0 input of the 2 input multiplexers. These data bit positions are utilized in the 64 bit configuration of the circuits according to the present invention to generate the required sign bit information in that configuration. Details of the 64 bit configuration will be provided below.

From the above description, those of skill in the art will readily be able to produce the control circuit to produce the control signals for controlling the circuitry of FIG. 3A from the circuits illustrated in FIG. 6, FIG. 7 and from the equations in Table 4.

Referring now to Table 5, the equations for developing the control signals on FIG. 3B are shown. The equations in Table 5 comprise those signals which were not previously listed on Table 4. These control signals are developed either directly from input signals or from other signals whose equations are shown in Table 5 or the circuits illustrated in FIGS. 6 and 7. Table 6 provides the equations for the control signals used by the circuitry of FIG. 3C. Like the signals developed in the equations of the other tables, those of Table 6 are derived either directly from inputs to the barrel shifter or from intermediate signals whose equations have been shown in one of the other tables. Table 7 illustrates the equations for the further control signals utilized by the circuitry of FIG. 3D which have not been previously described.

FIGS. 3A–3D, 4, 4A, 5, 5A, 6 and 7 in conjunction with the data in Tables 1 through 7 completely defines the barrel shifter in accordance with the present invention. The illustrated implementation of the barrel shifter is in three functional levels although more logic levels are employed. The first functional level is a left "byte rotator" because it rotates data either 0, 8, 16 or 24 bit positions to the left. It uses 40 4:1 multiplexers and the rotate amount is selected by the control signals applied to the level. The second functional level is a left nibble shifter as it shifts data left either 0 or 4 bit positions. The circuitry in this level comprises 35 special function 2:1 multiplexers and 5 standard 2:1 multiplexers. The logic in this level is controlled by the appropriate control functions to perform filling 0's or 1's as required by the particular barrel shift operation instruction as well as sign extension where required. The third functional level includes the third logic level which shifts data left either 0 or 2 bit positions and comprises 32 2:1 multiplexers and 5 4:1 multiplexers. The fourth logic level operates to shift data left either 0 or 1 bit position. This level and the third logical level are controlled by appropriate control signals to select the desired number of bit positions that the data is shifted to the left. In view of this configuration, data can be rotated either left or right any number of data bit positions depending on the selected shift amount.

As already described, the shifter according to the present invention is divided into four "horizontal" sections, namely Section C, B, A and Z. Section C generates the most significant 16 output data bits $Y_{31}$–$Y_{16}$ and will not shift data when the required operation is one for a half word or quarter word function. Section B generates bit positions $Y_{15}$–$Y_8$. It will not shift data when the requested operation is on a quarter word or 1 byte. Section B is also used for shifting data into Section C. Section A generates the least significant byte (positions $Y_7$–$Y_0$) and shifts data into Section B. Section Z is used for carry out generation and shifting data into Section A.

As has been mentioned previously in this specification, the circuitry described already can be utilized in a configuration for performing the same barrel shifting operations on a 64 bit input word. The hardware for this configuration is illustrated in FIG. 8 and the control signals for controlling this circuitry are found in Table 3. Of particular note in the circuit of FIG. 8 is the fact that the circuitry described in conjunction with FIGS. 3A–3D essentially comprise the elements found within the box labeled Odd shifter and a second set of circuitry identical to that is found within the circuitry Even shifter. The Odd shifter produces some control signals at its output which are used to control the 2 to 1 multiplexer coupled to the output bit positions from the two shifters. These control signals are specified in Table 8 in terms of input signals to the two shifters.

The circuitry of FIG. 8 also shows two output signals which have not been previously discussed. These signals are MUX $C_{in}$ and $C_{out}$. These signals are developed by the circuitry illustrated in FIG. 9 from the input signals which primarily comprise input signals to the barrel shifter although the internal $C_{out}$ from FIG. 3D is also utilized. These signals are wired directly together in FIG. 8 to form the final carryout (final $C_{out}$) signal. The MUX $C_{in}$ signals are wired together and form an input to the 2 to 1 multiplexer coupled to the output of the two shifters. The MUX $C_{in}$ signal represents the carry in to the low order bit position as a result of the shifting operation performed by the odd and even shifters and the final $C_{out}$ comprises the lowest order bit carried out of the shifter as a function of the shifting operation performed thereby. These carry out and carry in bits are utilized in various operations in digital computers and the like.

64 bit operations are performed by integrating two of the previously described 32 bit barrel shifters and a 2:1 multiplexer. This configuration has the same functionality as the 32 bit configuration. The only differences are that all data widths and the maximum shift amount have been doubled. The new word widths are 64 bit (full word), 32 bit half word and 16 bit quarter word. The shift amount ranges from 0 to 63 bit positions in either direction. Special attention is given to the following functions when cascading two barrel shifters: carry input to the external 2:1 multiplexer; data fill/sign extension; final carry out; and internal select lines when shifting right. The previously described control logic has all of these provisions built in.

The barrel shifters are configured by setting the control signal "dB" to a logic "1". The control signal "Odd" is connected to the appropriate logic level ("1"= odd shifter, "0"= even shifter). These signals are used by the internal control logic to steer data for the double-width configuration.

All even shift amounts (0, 2, 4, . . . 62) are performed in the barrel shifters using the five control signals. The remaining odd shift amount (even shift amount plus one) is performed in the external 2:1 multiplexer using the control signal $A_{-1}$. This is also used by the control logic in the barrel shifter for determining even/odd shift amount.

The external 2:1 multiplexer is an additional level of shifting and therefore requires carry-in data from previous levels. The control signal MUX Cin from the odd shifter is used for this reason. The carry-in is directed to data bit 0 ($R_0$) which is even numbered. Even bits are always adjoined by odd bits. That is why carry-in data directed to $R_0$ must always originate from the odd shifter.

Sign bits for the three data formats ($d_{63}$, $d_{31}$ and $d_{15}$) are odd numbered and must be connected to the even shifter for arithmetic sign extension. This is accomplished by using the $d_{63}$, $d_{31}$ and $d_{15}$ inputs on the even shifter.

The final carry-out may originate from either barrel shifter. One barrel shifter is selected by determining the shift operation, the shift amount (even or odd), and considering whether the shifter has even or odd numbered data bits.

The final level of shifting, like all other levels, consists of sections "C", "B" and "A". Section "C" generates the most significant 32 bits ($R_{63}$–$R_{32}$) and will not shift data when operating on half words or quarter words. Section "B" generates the next 16 bits ($R_{31}$–$R_{16}$) and will not shift data when operating on quarter words. It is also used for shifting data into section "C". Section "A" generates the least significant 16 bits ($R_{15}$–$R_0$) and shifts data into section "B". The select control of each section is independently directed by the following signals: SECTION "C" by signal $SC_{-1}$; SECTION "B" by signal $SB_{-1}$; SECTION "A" by signal $SA_{-1}$.

The foregoing description has made particular emphasis on a given implementation which, in the preferred embodiment, is implemented in ECL logic although CMOS could be used as well. Other circuit families may also be utilized. The internal circuits to the chip are parts of a macro cell array and are formed in Motorola's macro cell library. When implemented in the manner indicated by the circuitry of the figures already described, most of the 32 bit operations are performed in 3.65 nanoseconds with the worst case being arithmetic left shift which takes 4.175 nanoseconds. In the 64 bit configuration, the propagation delay through the barrel shifter of the present invention is 1.9 nanoseconds longer than for the 32 bit configuration. In contrast, the AS 897 barrel shifter part mentioned in the background of the invention is a 15 MHz part and, accordingly, the propagation delay through that part is approximately 67 nanoseconds. Accordingly, the speed of the barrel shifter according to the present invention is approximately 8 times faster than the AS 897.

The foregoing description has been made with particular emphasis on the circuitry illustrated in the drawings. Those of skill in the art will readily recognize, however, that substitutions of equivalent circuits may be possible and that such substitutions can be made without departing from the spirit and scope of the present invention as defined in the following claims.

What is claimed is:

1. A barrel shifter responsive to control signals for producing a plurality of operations on a plurality of data bits including rotate, logical shift, arithmetic shift, rotate with programmable fill, logical shift with programmable fill, arithmetic shift with programmable fill, rotate and mask and extract and mask, the shifter comprising, in combination:

a first level of logic circuits responsive to the data bits for producing at its output the data bits rotated by a selectable number of either 0, 8, 16, or 24 bit positions as defined by said control signals;

a second level of logic circuits coupled to the output of said first level of logic circuits for producing at its output the data bits from said first level of logic circuits shifted by a selectable amount of 0 or 4 bit positions as defined by said control signals, said second level logic circuits including means responsive to said control signals to replace selectable data bits of the output data bits therefrom with selectable fill bits in accordance with the operation selected by said control signals; and a third level of logic circuits coupled to the output of said second level logic circuits for producing at its output in response to said control signals data bits shifted by a selectable bit amount of 0, 1, 2 or 3 bit positions.

2. The barrel shifter of claim 1 wherein said first level of logic circuit comprises a plurality of 4:1 multiplexers wired to produce said selectable bit shift.

3. The barrel shifter of claim 1 wherein said third level of logic comprises a plurality of 4:1 multiplexers wired to produce said selectable bit shift.

4. The barrel shifter of claim 1 wherein said second level logic circuit includes a first type of multiplexer each having a single enable input, a fill input and a select input as well as 2 data input lines, when said enable input is at one state, the output of said first type multiplexer is the state of 1 data line selected by the state of said select input and when said enable input is at its other state, the output of said first type of multiplexer is the state of said fill input.

5. The barrel shifter of claim 1 wherein said second level logic circuit includes a second type of multiplexer each having 2 enable inputs ($EN_a$ and $EN_b$), 2 data inputs (A and B), a fill input ($S_x$) and a select input ($S_2$), said second type of multiplexer being operative in accordance with the following truth table where X represents a don't care condition:

| A | B | $S_x$ | $EN_b$ | $EN_a$ | $S_2$ | Output |
|---|---|-------|--------|--------|-------|--------|
| 0 | X | X | 1 | 1 | 0 | 0 |
| 1 | X | X | 1 | 1 | 0 | 1 |
| X | 0 | X | 1 | 1 | 1 | 0 |
| X | 1 | X | 1 | 1 | 1 | 1 |
| X | X | 0 | X | 0 | 0 | 0 |
| X | X | 1 | X | 0 | 0 | 1 |
| X | X | 0 | 0 | X | 1 | 0 |
| X | X | 1 | 0 | X | 1 | 1 |

6. The barrel shifter of claim 1 wherein:
the first level rotates left;
the second level shifts left; and
the third level shifts left.

7. The barrel shifter of claim 6 wherein the third level comprises;

a first shifter level coupled to the output of said second level logic circuits for producing at its output in response to said control signals data bits shifted left by a selectable bit amount of 0 or 2 bit positions; and a second shifter level coupled to the output of the first shifter level for producing at its output in response to said control signals data bits shifted left by a selectable bit amount of 0 or 1 bit position.

8. The barrel shifter of claim 6 wherein the first level of logic circuit comprises a plurality of 4:1 multiplexers connected to provide the selectable bit shift.

9. The barrel shifter of claim 6 wherein the second level logic circuit comprises a first type of multiplexer having a single enable input, a fill input and a select input as well as 2 data input lines, the output of the multiplexer being the state of one data line selected by the state of the select input when the enable input is at one state and the output of the multiplexer being the state of the fill input when the enable input is at another state.

10. The barrel shifter of claim 6 wherein the second level logic circuit comprises a second type of multiplexer having 2 enable inputs ($EN_a$ and $EN_b$), 2 data inputs (A and B), a fill input ($S_x$) and a select input ($S_2$), the second type of multiplexer being operative in accordance with the following truth table where X represents a don't care condition:

| A | B | $S_x$ | $EN_b$ | $EN_a$ | $S_2$ | Output |
|---|---|---|---|---|---|---|
| 0 | X | X | 1 | 1 | 0 | 0 |
| 1 | X | X | 1 | 1 | 0 | 1 |
| X | 0 | X | 1 | 1 | 1 | 0 |
| X | 1 | X | 1 | 1 | 1 | 1 |
| X | X | 0 | X | 0 | 0 | 0 |
| X | X | 1 | X | 0 | 0 | 1 |
| X | X | 0 | 0 | X | 1 | 0 |
| X | X | 1 | 0 | X | 1 | 1 |

11. The barrel shifter of claim 10 wherein the second level logic circuit further comprises a first type of multiplexer having a single enable input, a fill input and a select input as well as 2 data input lines, the output of the multiplexer being the state of one data line selected by the state of the select input when the enable input is at one state and the output of the multiplexer being the state of the fill input when the enable input is at another state.

12. A barrel shifter responsive to control signals for producing a plurality of operations on a plurality of data bits organized in bytes of 8 data bits each including rotate, logical shift, arithmetic shift, rotate with programmable fill, logical shift with programmable fill, arithmetic shift with programmable fill, rotate and mask and extract and mask, the shifter comprising, in combination:

an even and an odd barrel shifter, each comprising:
a first level of logic circuits responsive to the data bits for producing at its output the data bits rotated by a selectable number of half-words of either 0, 1, 2 or 3 half-words as defined by said control signals;
a second level of logic circuits coupled to the output of said first level of logic circuits for producing at its output the data bits from said first level of logic circuits shifted by a selectable number of bytes, either 0 or 1 as defined by said control signals, said second level logic circuits including means responsive to said control signals to replace selectable data bits of the output data bits therefrom with selectable fill bits in accordance with the operation selected by said control signals;
a third level of logic circuits coupled to the output of said second level logic circuits for producing at its output, in response to said control signals data bits shifted by a selectable bit amount of 0, 2, 4 or 6 bit positions;
said even shifter being coupled to receive even numbered data bit positions at its input to its said first level of logic circuits;
said odd shifter being coupled to receive odd numbered data bit positions at its input to its said first level of logic circuits; and
a plurality of 2:1 output multiplexers each coupled to the same designated position of the third level logic circuit from said odd shifter and from said even shifter to produce in response to control signals thereto either a 0 or a 1 bit shift of the output from said odd shifter and said even shifter in accordance with the control signals applied thereto.

13. The barrel shifter of claim 12 wherein:
the first level of the even shifter and the odd shifter rotates left;
the second level of the even shifter and the odd shifter shifts left; and
the third level of the even shifter and the odd shifter shifts left.

* * * * *